United States Patent [19]
Boetzel et al.

[11] Patent Number: 6,091,763
[45] Date of Patent: Jul. 18, 2000

[54] METHOD FOR INCREASING THE RANGE IN A TIME-SLOT METHOD

[75] Inventors: Ulrich Boetzel, Kaarst; Michael Huetwohl, Essen, both of Germany; Johannes Oesterreicher, Baden, Austria

[73] Assignee: Siemens Aktiengesellschaft, Munich, Germany

[21] Appl. No.: 08/941,051

[22] Filed: Sep. 30, 1997

[30] Foreign Application Priority Data

Sep. 30, 1996 [DE] Germany ............................ 196 40 217

[51] Int. Cl.[7] ............................ H04B 17/02; H04B 3/36; H04B 7/17; H04L 25/20
[52] U.S. Cl. ............................ 375/211; 370/294
[58] Field of Search ............................ 375/211, 356; 370/293, 294, 337, 347, 345, 507, 508, 519

[56] References Cited

U.S. PATENT DOCUMENTS

| | | | |
|---|---|---|---|
| 5,519,710 | 5/1996 | Otsuka | 370/337 |
| 5,541,979 | 7/1996 | Leslie et al. | 455/436 |
| 5,544,171 | 8/1996 | Godecker | 370/337 |
| 5,615,215 | 3/1997 | Utting et al. | 370/337 |
| 5,745,484 | 4/1998 | Scott | 370/347 |

FOREIGN PATENT DOCUMENTS

| | | |
|---|---|---|
| 0 511 614 A2 | 11/1992 | European Pat. Off. . |
| 0 722 229 A1 | 7/1996 | European Pat. Off. . |
| 37 29 586 A1 | 3/1989 | Germany . |
| 44 00 331 A1 | 7/1995 | Germany . |
| 195 34 156 C1 | 10/1996 | Germany . |

OTHER PUBLICATIONS

European Telecommunication Standard, EPS 300 175–2 (Oct. 1992) pp. 3–39; and EPS 300 175–3 (Sep. 1996, Second Edition) pp. 3–200.

*Primary Examiner*—Don N. Vo
*Assistant Examiner*—Phuong Phu
*Attorney, Agent, or Firm*—Hill & Simpson

[57] ABSTRACT

In order to increase the range of a repeater in a DECT-TDMA system without shortening the time spacing between transmission and reception time-slots (TX, RX), the transmission time-slots (TX) with mobile part functionality (MT) are delayed in time by a bit plurality t.

8 Claims, 2 Drawing Sheets

METHOD FOR INCREASING THE RANGE IN A TIME-SLOT METHOD

BACKGROUND OF THE INVENTION

The present invention is directed to a method for increasing the range in a time-slot method.

Time-slot methods are applied, for example, in cordless communication systems using a digital transmission technique. As access to the spectrum, these telecommunication systems employ a time-division multiple access (TDMA) method. The present invention is employable for DECT (Digital Enhanced Cordless Telecommunication) standard.

In the DECT TDMA system with full-slots, 24 time-slots (full-slots) each having 480 bits are accommodated in 20 ms. A time-slot contains 424 data bits and 56 bits of guard time. The 56 bits of guard time can be utilized for a transit time of the signal in air and, thus, are directly converted into the range between transmitter and receiver.

One possibility for increasing the range is described in the timing advance in the second edition of the DECT Standard. A mobile part does not receive and transmit the time-slots separated by exactly 5 ms but compresses these in time to less than 5 ms and thus compensates for longer transit times on the air link. However, this requires an additional protocol outlay and an appropriate performance feature of the mobile part.

SUMMARY OF THE INVENTION

It is an object of the present invention to provide a method with which the range between transmitter and receiver can be increased, and, at the same time, the 5 ms time duration from reception to transmission time-slots can be preserved at the antenna.

In general terms the present invention is a method for increasing the range in a time-slot method between a repeater and one or more mobile parts. Signals are transmitted bidirectionally between a base station and the repeater. Signals are transmitted bidirectionally between the repeater and the mobile part or parts. The transmission time slot or slots with mobile part functionality are shifted in time in a frame in the repeater.

Advantageous developments of the present invention are as follows.

The maximum plurality t of the bits by which the transmission time-slots are shifted is determined from the maximally possible shift of the last time-slot in the frame relative to the first time-slot in the next frame when the last slot in the frame is a transmission slot in the mobile part mode and the first slot in the next frame is a transmission slot in the base part mode.

Counting from a start value to an end value is periodically carried out in a reference counter. The transmission event in the base station mode is implemented when the start value is reached.

The reference counter is synchronized by the reception slots in the mobile part mode such that the first bit of the received time-slot comes to lie at bit t+k of the reference counter, where k is a compensation value.

The compensation time k derives from the transit time of the signal through a radio frequency component of a transmitter.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

DESCRIPTION OF THE PREFERRED EMBODIMENTS

Figure 1:
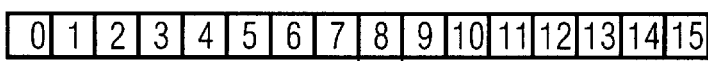
FIG. 1 depicts a DECT frame structure.
Figure 1:
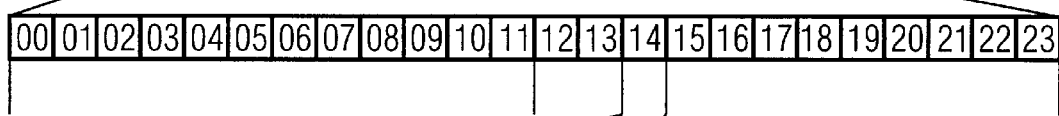
Figure 1:
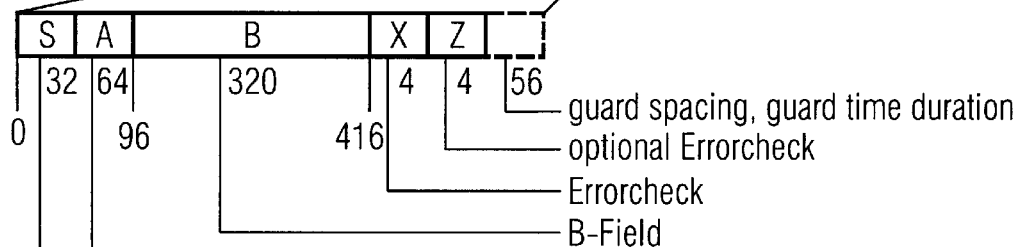
Figure 1:
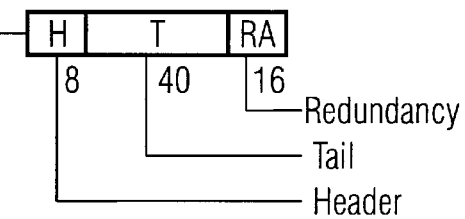
Figure 1:
Figure 2:
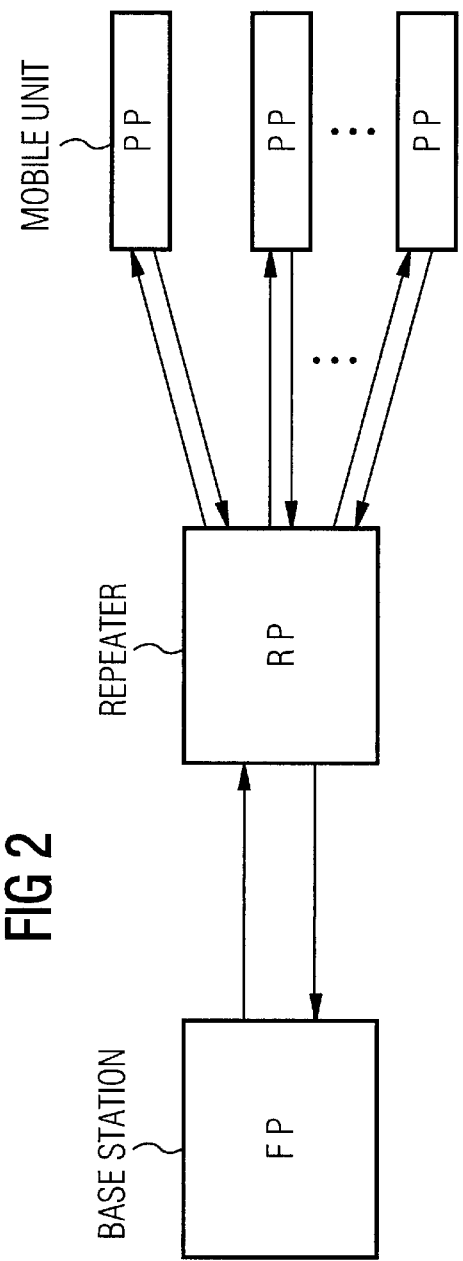
FIG. 2 depicts a base station connected to mobile units via a repeater.
Figure 3:
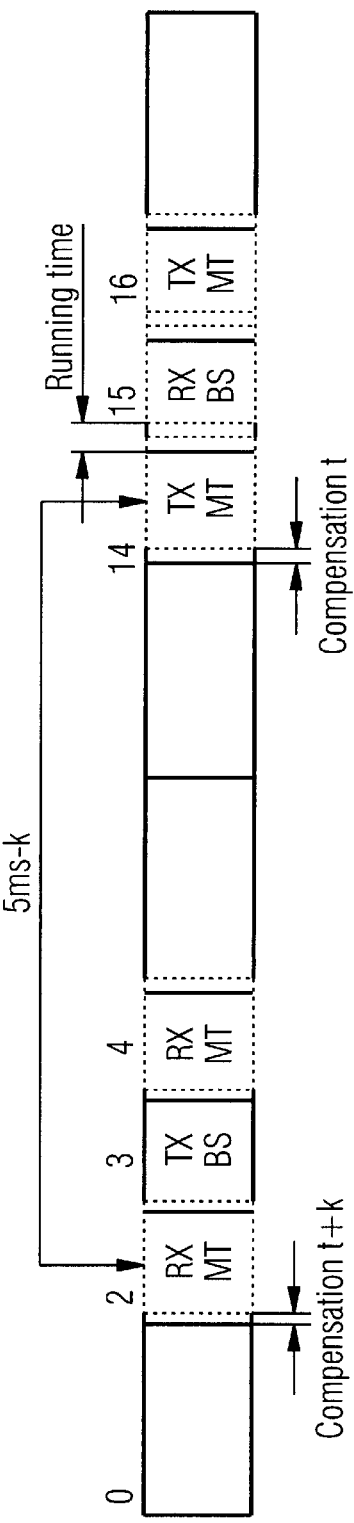
FIG. 3 depicts a frame having a plurality of transmission and reception time-slots.

FIG. 3 shows a frame in which a plurality of transmission and reception time-slots are entered by way of example. In the case illustrated in FIG. 3, the slot 2 represents a reception time-slot RX with mobile part functionality MT. Slot 3 is a transmission time-slot TX with base station functionality BS. Slot 4 corresponds to slot 2. The slots 14 and 16 are transmission time-slots TX with mobile part functionality MT. Slot 15, finally, is a reception time-slot with base station functionality. The slots 2 and 14 or, respectively, 3 and 15 or, respectively, 4 and 15 respectively foram a channel (connection). The DECT frame structure is shown in FIG. 1. A multiframe contains 16 frames. A frame has a frame time duration of 10 ms, this corresponding to 11520 bits. The frame is divided into 2×12 full-slots of equal size, which are also referred to as slots or time-slots below. These are referenced 00, 01, 02, ... 23 in FIG. 1. As depicted in FIG. 2, the base station, also referred to as fixed part FP, transmits to a repeater RP that in turn transmits to the mobile parts, which are also referred to as handset or portable unit PP. Conversely, the portable parts PP transmit to the repeater RP that in turn transmits to the base station FP.

Each time-slot lasts 416 ms, which corresponds to 480 bits. As shown in FIG. 1, a time-slot is divided into a 32-bit wide synchronization field S, also referred to below as sync-field, into a 64-bit wide A-field that serves for signalling, into 320-bit wide B-field that contains the voice data, into a 4-bit wide X-field, a 4-bit wide Z-field and a guard field lasting about 50 µs (56 bits) that is also referred to as guard space or guard time.

The X-field serves for the error check over 84 bits in the B-field when the B-field is unprotected. The Z-field is an optional error check achieved by doubling the X-field. The S-field is subdivided into 16 bits for bit synchronization and another 16 bits for word synchronization. The A-field is composed of a header H (8 bits), a tail T (40 bits) and the 16-bit long redundancy. Further details of the DECT frame structure can be looked up in the European telecommunication Standard EPS 300175-2 and EPS 300175-3.

A time of 5 ms is set, measured at the antenna, between reception and transmitting in the mobile part PP. The signal receives a delay of n µs over the transit link, dependent on the distance between mobile part PP and repeater RP or, respectively, repeater RP and base station FP.

For this reason, the reception in the reception time-slots RX can assume different points in time dependent on the distance or range.

The case that is important for the range of a repeater occurs given the succession of a reception slot RX with base station functionality BS (affected with running time) and a directly following transmission time-slot PX in the mobile part mode MT. Due to the DECT rule, the transmitter is already driven 12 bits before the first data bit for the transmission slot. The guard time of 56 bits is thus shortened by 12 bits to 44 bits in which the radiofrequency part (RF part) can seek a new frequency. When the transiency of the RF part is set at 20 bits, then the range that could be achieved with this time-slot configuration is limited to (44–20 bits)× 868 ns/bit×300,000 km/s/2=2.8 km.

An additional range can be acquired in that the transmission time-slot in the mobile part mode MT is shifted by a compensation value t. In the sense of base and mobile station, a repeater exhibits the possibility of being able to both receive as well as transmit in all 24 time-slots of a frame. That is, a reception time-slot RX can be immediately followed by a transmission time-slot TX that can in turn be followed by a reception time-slot RX. Since the repeater RP must assure both the base station functionality as well as the mobile part functionality, the chronologically correct sequence of the time-slots must be assured.

A timer (bit counter) prescribes the main timing of the repeater RP. This timer is referred to below as reference bit counter or reference counter. The transmission times of the transmission time-slots TX are derived therefrom. The transmission time-slots TX in the base station mode BS are sent with the zero-axis crossing of the reference bit counter. The time-slots RX received 12 time-slots later can thus be expected at the point in time 5 ms plus twice the running time. With reference to the zero-axis crossing of the reference bit counter, the transmission time-slots TX in the mobile part mode MT are sent later by a bit plurality t. The reference bit counter is synchronized by the reception time-slots RX in the mobile part mode MT such that the bit with the bit number 0 of the received time-slot RX comes to lie at bit number t+k of the reference bit counter. The compensation of the RF running time is referenced k. The value k can, for example, assume 6 bits. Additional range is acquired due to the shift of the transmission time-slots TX in the mobile part mode MT by the compensation value t. The compensation value t is determined from the transition of the timeslot with the time-slot number 23 (transmission time-slot in the mobile part mode) to the time-slot having the time-slot number 0 (transmission time-slot in the base station mode) of the following frame. The maximum value of t derives as 56–2×12–20=12 bits wherein 56 represents the bits of protective time which are available, 12 represents the bits of power amplifier which remain activated after the last data bit as well as the 12 bits which are activated again before slot 0 (thus, 2 times 12), and 20 represents the bits which are assumed as the frequency must be reset. A range of 12bits×0.868µs/bit×300,000km/s:2=1.6 km can thus be acquired given a compensation value t=12 bits wherein 12 bits represents the shift that arose due to the compensation value t=12 bits, 0.868 microseconds is the bit duration, 300,000km/s is the light speed, and the :2 is necessary since the forward and return path to the terminal device must be considered. An approximately 50% increase in the range of the repeater RP is thus possible on the basis of this measure. At the same time, the delays produced by the running time through the RF parts can be compensated.

DECT demands a spacing of 5 ms at the antenna between reception and transmission of time-slots for the mobile part. The information from the antenna or, respectively, to the antenna thus arrive at the base band delayed by about 3 bits given reception and delayed by 3 bits given transmission. This delay can be achieved by the synchronization of the reference bit counter to a time position of t+k compared to the reception time slot RX. The desired 5 ms can thus be adhered to.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for increasing a range in a time-slot method between a repeater and at least one mobile part comprising the steps of:

transmitting signals bidirectionally between a base station and the repeater;

transmitting signals bidirectionally between the repeater and the at least one mobile part;

shifting in time at least one transmission time slot having mobile part functionally in a respective frame in the repeater; and periodically counting from a start value to an end value in a reference counter, and implementing a transmission event in a base station mode when the start value is reached.

2. The method according to claim 1, wherein the reference counter is synchronized by reception slots in the mobile part mode such that a first bit of a reception slot is a bit t+k of the reference counter, where k is a compensation value which derives from a transit time of a signal through a radio frequency component of a transmitter.

3. A method for increasing a range in a time-slot method between a repeater and at least one mobile part comprising the steps of:

transmitting signals bidirectionally between a base station and the repeater;

transmitting signals bidirectionally between the repeater and the at least one mobile part;

shifting in time transmission time slots having mobile part functionality in a respective frame in the repeater; and determining a maximum plurality t of bits, by which transmission time-slots are shifted, from a maximally possible shift of a last time-slot in the respective frame relative to a first time-slot in a next frame when the last slot in the respective frame is a transmission slot in a mobile part mode and the first slot in the next frame is a transmission slot in a base part mode.

4. The method according to claim 3, wherein the method further comprises periodically counting from a start value to an end value in a reference counter, and implementing a transmission event in a base station mode when the start value is reached.

5. The method according to claim 4, wherein the reference counter is synchronized by reception slots in the mobile part mode such that a first bit of a received time-slot is at bit t+k of the reference counter, where k is a compensation value.

6. The method according to claim 5, wherein the compensation time k derives from a transit time of a signal through a radio frequency component of a transmitter.

7. A method for increasing a range in a time-slot method between a repeater and at least one mobile part comprising the steps of:

transmitting signals bidirectionally between a base station and the repeater;

transmitting signals bidirectionally between the repeater and the at least one mobile part; and shifting in time at least one transmission time slot having mobile part functionality in a respective frame in the repeater;

periodically counting from a start value to an end value in a reference counter, and implementing a transmission event in a base station mode when the start value is reached; and synchronizing the reference counter by reception slots in the mobile part mode.

8. The method according to claim 7, wherein a maximum plurality t of bits by which transmission time-slots are shifted is determined from a maximally possible shift of a last time-slot in the respective frame relative to a first time-slot in a next frame when the last slot in the respective frame is a transmission slot in a mobile part mode and the first slot in the next frame is a transmission slot in a base part mode.

* * * * *